US006551716B1

(12) United States Patent
Landa et al.

(10) Patent No.: US 6,551,716 B1
(45) Date of Patent: Apr. 22, 2003

(54) INTERMEDIATE TRANSFER BLANKET AND METHOD OF PRODUCING THE SAME

(75) Inventors: Benzion Landa, Nes-Ziona (IL); Marc Aronhime, Rehovot (IL); Nava Klein, Rishon-Lezion (IL); Erez Faraggi, Tel-Aviv (IL); Carlos Teper, Rehovot (IL); Amiran Lavon, Bat-Yam (IL); Yael Kowal, Tel-Aviv (IL)

(73) Assignee: Indigo N.V., Maastricht (NL)

( * ) Notice: Subject to any disclaimer, the term of this patent is extended or adjusted under 35 U.S.C. 154(b) by 0 days.

(21) Appl. No.: 09/445,035

(22) PCT Filed: Jun. 3, 1997

(86) PCT No.: PCT/IL97/00176

§ 371 (c)(1), (2), (4) Date: Nov. 30, 1999

(87) PCT Pub. No.: WO98/55901

PCT Pub. Date: Dec. 10, 1998

(51) Int. Cl.[7] ............................ B32B 9/04; B05D 3/02; B05D 3/10; G03G 5/00; G03G 15/14

(52) U.S. Cl. ....................... 428/447; 428/446; 428/448; 428/909; 427/387; 427/402; 427/407.1; 430/131; 430/132; 399/302; 399/308

(58) Field of Search ................................ 428/428, 429, 428/446, 447; 427/387, 397.7, 397.8, 402, 407.1; 430/132, 131; 399/121, 302, 308

(56) References Cited

U.S. PATENT DOCUMENTS

| | | | | | |
|---|---|---|---|---|---|
| 3,862,848 | A | | 1/1975 | Marley | |
| 3,893,761 | A | | 7/1975 | Buchan et al. | |
| 3,983,287 | A | | 9/1976 | Goossen et al. | |
| 4,066,802 | A | | 1/1978 | Clemens | |
| 4,074,001 | A | | 2/1978 | Imai et al. | |
| 4,093,487 | A | | 6/1978 | Gaworowski et al. | |
| 4,112,841 | A | | 9/1978 | Deshpande | |
| 4,114,535 | A | | 9/1978 | Deshpande | |
| 4,511,622 | A | | 4/1985 | Seimiya et al. | |
| 4,531,825 | A | | 7/1985 | Miwa et al. | |
| 4,595,602 | A | | 6/1986 | Schank | |
| 4,600,673 | A | | 7/1986 | Hendrickson et al. | |
| 4,684,238 | A | | 8/1987 | Till et al. | |
| 4,690,539 | A | | 9/1987 | Radulski et al. | |
| 4,935,300 | A | * | 6/1990 | Parker et al. | 428/352 |
| 4,984,025 | A | | 1/1991 | Landa et al. | |
| 5,012,291 | A | | 4/1991 | Buchan et al. | |
| 5,047,808 | A | | 9/1991 | Landa et al. | |
| 5,089,856 | A | | 2/1992 | Landa et al. | |
| 5,103,263 | A | | 4/1992 | Moore et al. | |
| 5,114,520 | A | | 5/1992 | Wang et al | |
| 5,114,814 | A | | 5/1992 | Sakoh et al. | |
| 5,213,899 | A | * | 5/1993 | Lucas | 428/447 |
| 5,227,850 | A | | 7/1993 | Sato et al. | |
| 5,276,492 | A | | 1/1994 | Landa et al. | |
| 5,335,054 | A | | 8/1994 | Landa et al. | |
| 5,340,679 | A | | 8/1994 | Badesha et al. | |
| 5,356,987 | A | * | 10/1994 | Stephenson | 524/512 |
| 5,370,931 | A | | 12/1994 | Fratangelo et al. | |
| 5,413,809 | A | * | 5/1995 | Hazan | 427/140 |
| 5,430,002 | A | * | 7/1995 | Tamura et al. | 503/227 |
| 5,497,222 | A | | 3/1996 | Landa et al. | |
| 5,576,818 | A | * | 11/1996 | Badesha et al. | 399/308 |
| 5,968,656 | A | * | 10/1999 | Ezenyilimba et al. | 399/297 |
| 6,020,098 | A | * | 2/2000 | Bretscher et al. | 430/67 |

FOREIGN PATENT DOCUMENTS

| | | |
|---|---|---|
| EP | 0 399 186 | 11/1990 |
| EP | 0 399 794 | 11/1990 |
| EP | 0 534 472 A | 3/1993 |
| EP | 0 584 893 | 3/1994 |
| EP | 0 638 854 A | 2/1995 |
| JP | 57-19753 | 2/1982 |
| JP | 57-020742 | 2/1982 |
| JP | 62-293270 | 12/1987 |
| JP | 50-46037 | 2/1993 |
| WO | WO 90/04216 | 4/1990 |
| WO | WO 90/14619 | 11/1990 |
| WO | WO 91/03007 | 3/1991 |
| WO | WO 91/14393 | 10/1991 |
| WO | WO 96 11426 A | 4/1996 |
| WO | WO 96/14619 | 5/1996 |
| WO | WO 97 07433 A | 2/1997 |

OTHER PUBLICATIONS

Patent Abstracts of Japan, vol. 016, No. 261 (C–0950), Jun. 12, 1992 & JP 04 059832A (Takechikougiyou Gomu KK), Feb. 26, 1992.

* cited by examiner

*Primary Examiner*—Margaret G. Moore
*Assistant Examiner*—Michael J. Feely
(74) *Attorney, Agent, or Firm*—Fenster & Company

(57) ABSTRACT

A method of producing a coating on a member comprising: providing a body portion; coating the body portion with a catalyst material for a release coating material; and overcoating the catalyst material with an uncured polymer material for which the catalyst is active. Preferably, the release coating material is a condensation type silicone.

50 Claims, 2 Drawing Sheets

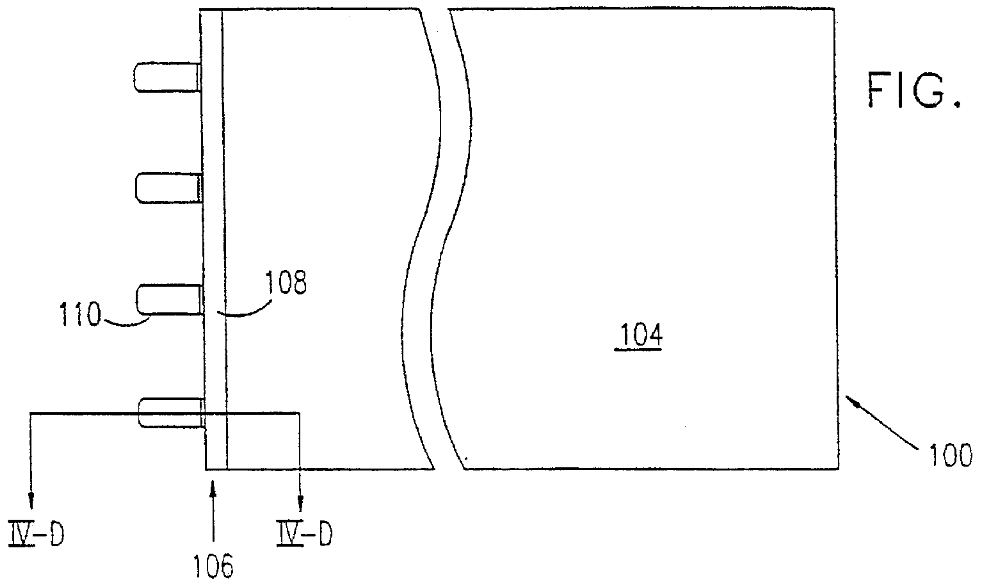
FIG. 2A
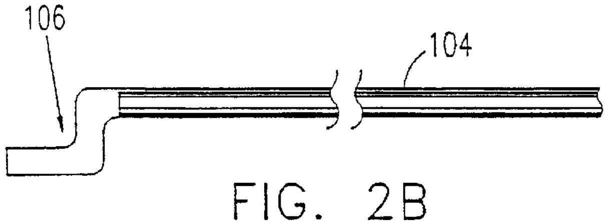
FIG. 2B
FIG. 2C
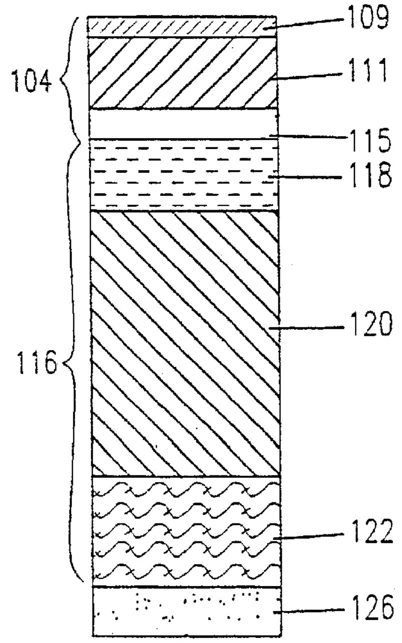

INTERMEDIATE TRANSFER BLANKET AND METHOD OF PRODUCING THE SAME

RELATED APPLICATION

The present application is a U.S. national stage application of PCT/IL97/00176, filed Jun. 3, 1997.

FIELD OF THE INVENTION

The present invention relates to improved intermediate transfer blankets, especially suited for transfer of liquid toner images, and methods of producing such blankets.

BACKGROUND OF THE INVENTION

The use of an intermediate transfer member in electrostatic imaging is well known.

Various types of intermediate transfer members are known and are described, for example in U.S. Pat. Nos. 3,862,848, 4,684,238, 4,690,539 and 4,531,825 and PCT publications WO 96/14619 and WO 97/07433, the specifications of all of which are incorporated herein by reference.

Belt-type intermediate transfer members for use in electrophotography are known in the art and are described, inter alia, in U.S. Pat. Nos. 3,893,761, 4,684,238 and 4,690,539, the specifications of all of which are incorporated herein by reference.

The use of intermediate transfer members and members including transfer blankets, for offset ink printing, is also well known. Such blankets have characteristics which are suitable for ink transfer but they are generally not usable, per se, for liquid toner imaging.

Multi-layered intermediate transfer blankets for toner imaging are known in the art. Generally, such blankets include a thin, multi-layered, image transfer portion and a base (or body) portion which supports the image transfer portion and provides the blanket with resilience during contact with an imaging surface and/or a final substrate. While the process for producing the image transfer portion is a relatively clean process, the base portion is generally not compatible with such clean processes.

One important characteristic of an intermediate transfer blanket is its image release properties. Many of the above referenced publications describe intermediate transfer blankets which are coated with a laver of release material, for example a silicone release layer.

WO 97/07433 describes, inter alia, a release coating comprised of a condensation type silicone material. Condensation type silicones give good release properties and other print quality advantages when used as the release layer for an intermediate transfer blanket. However, the standard catalyst systems are either two slow for useful in-line curing in continuous coating systems or cure so quickly and have no practical pot life. WO 97/07433 also describes a method of constructing an intermediate transfer blanket in which a transfer portion is laminated to a base portion to form the transfer member.

Condensation type silicon curing systems can be used to provide a thin film, as known in the art. Such systems provide very thin films for coating paper and the like with a release coating. However, such silicone materials (which appear to be based on methyl hydrogen cross-linkers) are not suitable for release coating for intermediate transfer blankets, since they do not have the abrasion resistance or the mechanical integrity required. Furthermore, they cannot easily be used to produce a release coating having the thickness required for an intermediate transfer member. For example, one such prior art material SS4191A release coating system (GE) is normally used with a low solids concentration (5%) in order to achieve the thin coating required for paper. When the material was concentrated, the pot life was limited so that it is not suitable for a continuous coating process.

SUMMARY OF THE INVENTION

It is an object of one aspect of the present invention to provide a method of coating an object, in particular a image transfer blanket or other intermediate transfer member in which the coating components have a relatively long, stable, pot life on the one hand but a very rapid cure on activation on the other.

The basis of this aspect of the invention is to separate the catalyst and polymer solutions used in forming the release layer and applying them successively to a blanket base. Preferably, the coating process is performed at two stations in a continuous coating system. As long as the two components are separated, the pot life of each material is very long. As soon as the components are brought into contact at the second coating station, a very rapid reaction occurs, preferably facilitated by heat. This allows for coating the bianket base continuously, in a practical manner.

The advantages of continuous coating include improved uniformity, repeatability, controllability and reduced manufacturing costs.

Few (if any) condensation type silicone rubbers exist with the unique combination of long pot life (hours) and rapid cure (<1 minute at 100° C.) for thin films (4–5 micron dry film thickness). Furthermore, the disclosed preferred system can be coated and cured onto various types of rubber (acrylic, nitrile), which would normally inhibit and prevent cure in addition-type silicone rubbers.

Preferably, the catalyst solution includes a primer or adhesive to aid adhesion to the underlying rubber, so that cure and adhesion are obtained simultaneously. The preferred silicone and catalyst solutions are optimized to provide improved print quality, ink release, abrasion resistance, long lifetime and good adhesion to an underlying rubber layer. Preferably, the catalyst should also include an additive to improve film forming. One suitable additive is silica.

In a second aspect of the invention, a conforming layer is laminated to the base portion of the intermediate transfer member and a release layer, preferably one produced according to the first aspect of the invention, is coated onto the conforming layer.

There is therefore provided in accordance with a preferred embodiment of the invention, a method of producing a coating on a member comprising:

providing a body portion;

coating the body portion with a catalyst material for a release coating material; and overcoating the catalyst material with an uncured polymer material for which the catalyst is active. Preferably, the release coating material is a condensation type silicone. Preferably, the silicone comprises a combination of two different silicone materials. Alternatively or additionally, the release coating material utilizes an alkoxy silane cross linker.

Alternatively or additionally, the catalyst coating comprises an adhesion promoter which promotes the adhesion of the cured coating to the body portion. Preferably, the adhesion promoter comprises a silane based primer. Further preferably, the adhesion promoter comprises (3-glycidoxypropyl) trimethoxysilane.

Alternatively or additionally, the body portion comprises a conforming layer on which the catalyst material is coated. Alternatively or additionally, the catalyst material comprises stannous octoate. Additionally or alternatively, the coating comprises a release coating.

In a preferred embodiment of the invention, the member is an intermediate transfer member for toner images. Preferably, the toner comprises a liquid toner.

In a preferred embodiment of the invention the catalyst coating comprises silica.

In a preferred embodiment of the invention, the coating is formed in a continuous coating process.

There is also provided in accordance with a preferred embodiment of the invention, a method of producing a cured condensation type silicone material, comprising:

providing an uncured material; and adding a stannous octoate catalyst.

There is also provided in accordance with a preferred embodiment of the invention, an intermediate transfer blanket coated with a condensation type silicon material produced by the above method.

There is provided in accordance with another preferred embodiment of the invention a method of producing a coating on an intermediate transfer member comprising:

providing a blanket body portion in web form; and coating the blanket body portion with a condensation type silicone release layer using a continuous coating process.

Preferably, the intermediate transfer member is an intermediate transfer member for toner images. Further preferably, the toner comprises liquid toner.

In a preferred embodiment of the invention, the release layer utilizes an alkoxy silane cross-linker.

There is also provided in accordance with a preferred embodiment of the invention, an intermediate transfer blanket produced by the above methods.

There is provided in accordance with another preferred embodiment of the invention an intermediate transfer blanket, in web form, coated with a release coating of condensation type silicon.

There is also provided in accordance with a preferred embodiment of the invention, an intermediate transfer blanket comprising:

a release layer; and an underlayer, comprising stannous octoate, beneath the release layer. Preferably, the release layer comprises dibutyltin dilaurate.

Alternatively or additionally, the underlayer comprises silica. Additionally or alternatively, the underlayer comprises a silane primer.

There is provided in accordance with another preferred embodiment of the invention, an intermediate transfer blanket comprising:

a release layer; and an underlayer, comprising a silane primer, beneath the release layer. Preferably, the underlayer comprises silica Alternatively or alternatively, the release layer comprises oleic acid.

There is also provided in accordance with a preferred embodiment of the invention, an intermediate transfer blanket comprising:

a release layer, comprising oleic acid; and an underlayer beneath the release layer. Preferably, the release layer comprises dibutyltin dilaurate.

Alternatively or additionally, the underlayer comprises silica. Alternatively or additionally, the underlayer comprises a silane primer. Alternatively or additionally, the underlayer comprises stannous octoate.

There is also provided in accordance with a preferred embodiment of the invention; an intermediate transfer blanket comprising:

a polymerized release layer; and an underlayer beneath the release layer, wherein the underlayer comprises a fast catalyst for forming the release layer and the release layer comprises a slow catalyst for forming the release layer.

Preferably, the release layer comprises an inhibitor for the slow catalyst.

In a preferred embodiment of the invention, the release layer is a condensation type release layer.

BRIEF DESCRIPTION OF THE DRAWINGS

The present invention will be understood and appreciated more fully from the following detailed description, taken in conjunction with the drawings in which:

FIGS. 2A and 2B are respective top and side views of the image transfer blanket of FIG. 1, in accordance with a preferred embodiment of the present invention; and FIG. 2C shows details of the multi-layered construction of the image transfer blanket of FIGS. 2A and 2B, in accordance with one, preferred, embodiment of the present invention.

DETAILED DESCRIPTION OF PREFERRED EMBODIMENTS

Figure 1:
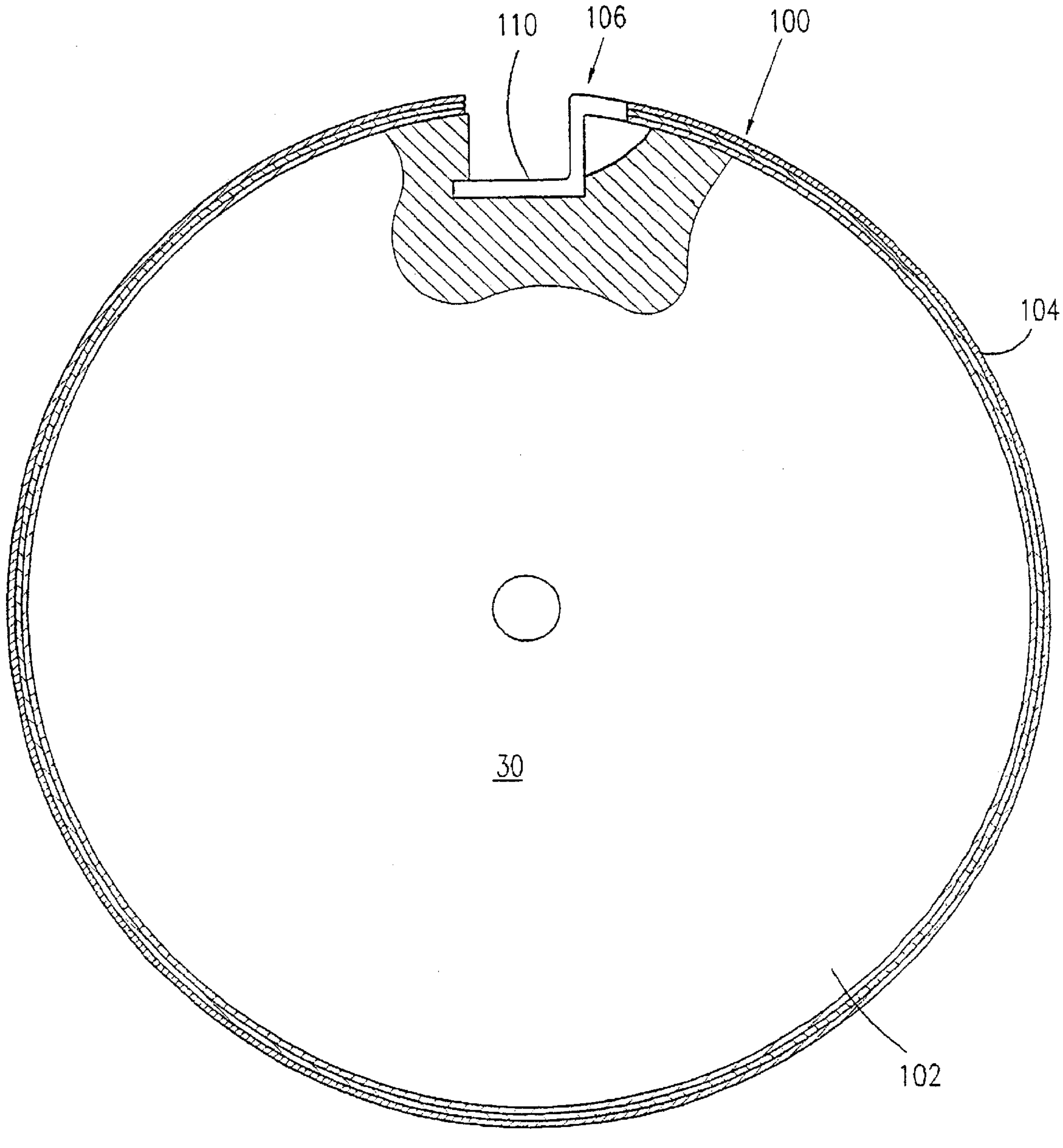
FIG. 1 is a simplified cross-sectional illustration of an image transfer member, including a multi-layered image transfer blanket mounted on a drum, in accordance with a preferred embodiment of the present invention.

Reference is now made to FIG. 1 which is a simplified cross-sectional illustration of an image transfer member 30, including a multi-layered image transfer blanket 100 mounted on a drum 102, in accordance with a preferred embodiment of the present invention. Image transfer member 30 is, preferably, an intermediate transfer member having a multilayered transfer portion such as those described below. As is known in the art, member 30 is maintained at a suitable voltage and temperature for electrostatic transfer of a toner image thereto from an image bearing surface, such as a photoreceptor surface. The image is preferably transferred from intermediate transfer member 30 onto a final substrate (not shown), such as paper, preferably by heat and pressure. For the preferred toner described in WO 96/11426, an image temperature of about 95° C. at the inception of fusing is preferred.

Certain aspects of the present invention, especially the manner in which transfer blanket 100 is mounted on drum 102 and the composition of the portion of the intermediate transfer member situated below the transfer layer, are shown and described by way of example only and may vary in accordance with specific requirements and design considerations. Other preferred methods of mounting the transfer blanket on the drum are shown in PCT application number PCT/NL 95/00188, whose disclosure is incorporated herein by reference. Other methods of manufacturing intermediate transfer members in the form of blankets and other types of blanket substrates are described, for example, in U.S. Pat. Nos. 5,089,856 or 5,047,808, the disclosures of which are incorporated herein by reference and in the documents mentioned in the Background of the Invention.

As known in the art, a plurality of single color images are preferably sequentially transferred, in mutual alignment, to the surface of an image transfer portion 104 of image transfer blanket 100, by sequential imaging cycles. When all of the desired images have been transferred to image transfer blanket 100, the complete multi-color image is transferred from transfer member 30 to the final substrate. Alternatively, each single color image may be separately transferred to the substrate via the intermediate transfer member, as known in the art.

Reference is now made to FIGS. 2A, 2B and 2C which schematically illustrate a preferred embodiment of image transfer blanket 100. As shown most clearly in FIG. 2C, image transfer portion 104 comprises a release layer 109 which is outermost on the blanket when it is mounted on drum 102. Underlying layer 109 is a conforming layer 111 preferably of a soft elastomer, preferably of polyurethane or acrylic and preferably having a Shore A hardness of less than about 65, more preferably, less than about 55, but preferably more than about 35. A suitable hardness value is between about 42 and about 45. Alternatively, layer 111 may have sub-layers of varying hardness, as described below.

A conductive layer 115 underlies layer 111 and overlays a blanket body 116 comprising a top layer 118, a compressible layer 120 and a fabric layer 122. In a preferred embodiment of the invention, as described in more detail below, top layer 118 is conductive and conductive layer 115 may be omitted.

Underlying the fabric layer there may be an adhesive layer 126 which is in contact with drum 102. Alternatively, layer 126 is a very soft, smooth, layer.

Drum 102 is preferably heated by an internal halogen lamp heater or other heater to aid transfer of the image to the release layer 109 and therefrom to the final substrate, as is well known in the art. Other heating methods, or no heating at all, may also be used in the practice of the invention. The degree of heating will depend on the characteristics of the toner and/or ink and substrate used in conjunction with the invention.

As shown in FIGS. 2A and 2B, mounting fitting 106 comprises an elongate electrically conducting bar 108, for example of a metal such as aluminum, formed with a series of L-shaped mounting legs 110 (in the form of finger-like extensions) which are also conducting, preferably of the same material as bar 108 and, preferably, formed integrally therewith. In particular, bar 108 is formed, in one preferred embodiment, with a slot into which the end of layered part of blanket 100 is inserted. Preferably, the end of the layered part which is inserted into the mounting bar does not include release layer 109 and conforming layer 111, whereby conducting layer 115 is exposed and is therefore in electrical contact with bar 108.

Alternatively, if layer 118 is conducting or layer 115 is made thick enough (preferably more than 40 micrometers thick) the slot can be formed with sharp internal projections which pierce the outer layers of the blanket and contact conducting layer 115 or conducting top layer 118.

Optionally, each of the layers beneath conducting layer 115 may be partially conducting (for example, by the addition of conductive carbon black or metal fibers) and the adhesive layer 126 may be conductive, such that current flows, additionally or alternatively, directly from the drum surface to the conducting layer. In this case layer 115 may generally be omitted.

Optionally, the conforming layer and/or the release layer are made somewhat conductive (preferably between $10^6$ and $10^{12}$ ohm-cm, more preferably, between $10^9$ and $10^{11}$ ohm-cm) by the addition of carbon black or between 1% and 10% of anti-static compounds such as CC-42 (Witco).

Alternatively, other methods of electrically connecting to the conducting layer are provided. For the purposes of most aspects of the present invention, the structure and method of electrical and mechanical attachment of the blanket to drum 30 is not relevant, per se, to the invention.

In one preferred embodiment of the invention, fitting 106 is formed of a single sheet of metal, wherein the legs are partially cut from the metal which is bent into a U-shape to form the slot into which the layered portion is inserted. After insertion, the outer walls of the slot are forced against the layered portion to secure the layered portion in the slot and, optionally, to pierce the outer surface of the blanket and contact the conductive layer. The partially cut out portion is bent to form the mounting legs.

In the preferred embodiment of the invention, drum 102 is maintained at a potential suitable for transferring images to the intermediate transfer member, for example at a negative voltage of 500 volts, which voltage is applied, via mounting fitting 106 to conductive layer 115 or 118. Thus, the source of transfer voltage is very near the outer surface of transfer portion 104 which allows for a lower transfer potential on the drum.

Apart from differences which will be appreciated from the descriptions herein, the multi-layered blanket 100 of the present invention is generally similar to that described in WO 96/11426, except for additional preferred embodiments as described herein and is also similar to the blankets described in WO 97/07433. However, the multi-layered blanket of the present invention is produced by a new process, as described below.

In a preferred embodiment of the invention, the construction of blanket body 116 is generally similar to that described in WO 96/11426. One suitable body is MCC-1129-02 manufactured and sold by Reeves SpA, Lodi Vecchio (Milano), Italy. Other preferred blanket types are described in U.S. Pat. Nos. 5,047,808; 4,984,025; 5,335,054 and PCT publications WO 91/03007; WO 91/14393; WO 90/14619; and WO 90/04216, which are incorporated herein by reference, and in WO 96/11426 and WO 97/07433. Body portion 116 preferably includes fabric layer 122, preferably formed of woven NOMEX material having a thickness of about 200 micrometers, and compressible layer 120, preferably comprising about 400 micrometers of saturated nitrile rubber loaded with carbon black to increase its thermal conductivity. Layer 120 preferably contains small voids (about 40–60% by volume) and top layer 118 is preferably formed of the same material as the compressible layer, but without voids. Blanket body 116 can be produced using production methods as are generally used for the production of offset printing blankets for ink offset printing.

Blanket body 116 is preferably sized to a relatively exact thickness by abrading portions of the surface of top layer 118. A preferred thickness for the finished body 116 is about 700 micrometers, although other thicknesses are useful, depending on the geometry of the printing system in which it is used and the exact materials used in the blanket body.

The fabric side of blanket body 116 may be coated with a 30 micrometer thick coating of silicone based adhesive (preferably, Type Q2-7566 manufactured by Dow Coming). The adhesive is covered with a sheet of mylar coated with a fluorosilicone material, such as DP 5648 Release Paper (one side coat) distributed by H. P. Smith Inc., Bedford Park, Ill. This adhesive is characterized by its good bond to the surface of drum 102 and its resistance to the carrier liquid used in the liquid toner. The blanket may be removed from drum 102, when its replacement is desired, by cutting the blanket along the edge of fitting 106 and removing the blanket and fitting.

An adhesive is preferably used to assure good thermal contact between the back of the blanket and the drum on which it is mounted. A silicone adhesive is preferred since adhesives normally used in attachment of blankets to drums in the printing art deteriorate under the heat which is generated in the underlying drum in the preferred apparatus. While the temperature of the drum varies, depending on the thermal resistance of the blanket and the desired surface temperature of the blanket (which in turn depends on the toner used in the process and the details of transfer of the toner to the final substrate), the drum temperature may reach 80° C., 100° C., 120° C. or 150° C. or more.

In a preferred embodiment of the invention, where a thicker conductive layer is desired for attachment to bar 108 by way of piercing elements, layer 118 is made conductive and layer 115 is omitted. For this embodiment a different conductive formulation is preferably used, which formulation is prepared as follows:

1—100 g of Hi-Temp 4051 EP (Zeon) acrylic resin and 15–25 grams of Printex XE-2 carbon black (Degussa) are mixed on an unheated two-roll mill or anbury mixer for 2–4 minutes.

2—2 g NPC-50 crosslinker (Zeon) and 3 g sodium stearate are added to the mixture on the two roll mill and mixing is continued for 4–10 minutes. The mill is kept cool to avoid premature polymerization of the acrylic resin.

3—The resulting mixture is dissolved and dispersed in toluene to give a mixture containing 17% to about 30% non-volatile solids.

4—The resultant mixture is progressively filtered, with a final filtering stage of 50 micrometers.

Layer 120 is overcoated with about 100 micrometers of the resulting material and is dried at up to 100° C. for a few minutes. Several layers of this material are added until the desired thickness of 100 micrometers is reached. This layer is sized as described above. The resulting conductive layer preferably has a resistance of 15 kΩ per square to 50 kΩ per square. Layer 118 is then cured.

The details of producing blankets having separate layers 115 and 118 are given in WO 97/07433.

The resistance of the conductive layer should preferably be more than about 15–20 kΩ per square and preferably less than about 50 kΩ per square. This value will depend on the resistivity of the layers above the conducting layer and on the aspect ratio of the blanket. In general, the resistance should be low enough so that the current flowing on the conducting layer (to supply leakage current through the overlying layers) does not cause a substantial variation of voltage along the surface of the blanket. The resistance of the conducting layer and, more importantly, the resistance of the overlying layers control the current flowing through the overlying layers. Generally speaking, the conductive layer has a relatively low resistance and resistivity, the conforming layer (layer 111) has a higher resistivity and the overlying release layer (layer 109) has a still higher resistivity.

In accordance with a preferred embodiment of the invention, layer 111 is formed by the following process:

1—100 g of Hi-Temp 4051 EP (Zeon) acrylic resin is mixed with 25 g of carbon black Pearls 130 (Cabot) in a Banbury internal mixer. This mixture is then mixed with 2 g NPC-50 accelerator (Zeon) and 3 g sodium stearate crosslinker on an open mill.

2—The compounded rubber resulting from step 1 is then dissolved in toluene and coated onto an appropriate release liner such as a metallized polyester film (for later attachment to the lower layers of the blanket as described below) to a thickness of 80 microns. The coating process may be repeated several times until a thickness of preferably 100 micrometers is achieved. Alternatively the layer may be directly coated on layer 118 or layer 115.

3—The hard layer is made by mixing 100 g of Hi-Temp 4051 EP (Zeon) acrylic resin with 40 g of carbon black Pearls 130 (Cabot) in a Banbury internal mixer. This mixture is then mixed with 2 g NPC-50 accelerator (Zeon) and 3 g sodium stearate crosslinker on an open mill.

4—The compounded rubber is then dissolved in toluene and coated onto the 80 micron softer layer to achieve a 20 micron harder layer, or a 100 micron total thickness. When layer 111 is formed as a sheet material, the uncured rubber layer is covered by another release liner, such as a metallized polyester film. The release liner on the softer side must release preferentially, so that the softer layer can be laminated to top layer 118 (or conductive layer 115) of the blanket body. This can be achieved by providing release liners with different release properties.

The layer has a Shore A hardness of about 20–24 without carbon black and about 42–45 with carbon black. Softer materials are also suitable. The acrylic material may be replaced by other soft elastomer materials such as soft nitrile rubber, as described in detail in WO 96/11426.

Layer 111 which is thus formed should have a resistance of the order of about $10^8$ ohm-cm, good thermal stability at the working temperature of the blanket surface, which is preferably about 100° C. or less.

The function of the conforming layer is to provide good conformation of the blanket to the image forming surface (and the image on the image forming surface) at the low pressures used in transfer of the image from the image forming surface to the blanket. When a layer 111 having a single hardness is used, it should have a Shore A hardness preferably of between 25 or 30 and 65, more preferably between 40 and 50, more preferably about 42–45. While a thickness of 100 micrometers is preferred, other thicknesses, between 50 micrometers and 300 micrometers can be used, with 75 to 125 micrometers being preferred. Too hard a layer can cause incomplete transfer to the intermediate transfer member of very small printed areas, such as single dots. Too soft a layer can cause difficulty in removal of a paper substrate (to which the image is transferred from the intermediate transfer member) from the intermediate transfer member. It is often difficult to achieve optimum transfer and substrate removal.

This problem is partially solved by dividing conforming layer 111 into a number of sub-layers of different hardnesses as described above. The sub-layers may have the same thickness or different thicknesses as described in the description of the preferred embodiment as described above. This embodiment is based on the discovery that paper removal appears to be most sensitive to the hardness of the upper portion of the layer and that transfer of the image to the transfer blanket is less sensitive to the hardness of this portion of the layer.

It was found that varying the hardness of the harder layer between 45 and 63 Shore A, the soft layer hardness between 35 and 42 and the thickness of the harder layer between 10 and 50 micrometers (the total layer thickness remaining at 100 micrometers) gives improved paper release properties. The image transfer was improved mainly for the experiments in which the hard layer was thinner and the soft layer softer. However, while conforming layer 111 may be formed of sub-layers having different hardness, a single hardness is also possible.

Alternatively, layer 111 may be formed in the same manner as layer 111 of the blanket of WO 97/07433.

Conforming layer 111 as obtained by the process described above is obtained as a roll of uncured acrylic rubber 100 microns thick, which is divided into an 80 micron softer layer and a 20 micron thick harder layer. This layer is preferably laminated onto the top layer of the blanket by applying heat and pressure with the interface being wetted by xylene. After lamination, the remaining release layer can be removed from the hard layer, so that the hard layer can be coated by the release layer as described below.

According to a preferred embodiment of the invention, release layer 109 is formed of a condensation type silicone release layer. In general such materials are not used for thin layers, such as the approximately 3–15 micrometer, preferably 5 micrometer layer, generally desired for the present invention.

It has been found that intermediate transfer members using condensation type silicone for release layer 109 have generally longer operating lifetime and generally better printing characteristics than blankets formed with release layers formed of other materials. This is also true of blankets in which the image transfer portion is formed directly onto the body as in the prior art. In a preferred embodiment of the invention only reactive silicone compounds are used in the formation of layer 109 with as small an amount of such compounds as silicone oils being present, less than 5% and preferably less than 1% of silicone oils being present. Furthermore, it has been found that such materials are generally most useful when they have no fillers or only a small amount of fillers.

Useful materials have been found to include diorganopolysiloxanes terminated at both chain ends with diorganohydroxysilyl groups bonded to terminal silicone atoms work especially well. Finally, it has been found that a mixture of such compounds gives better overall results than individual compounds.

It has been found, in a preferred embodiment of the invention, that using the individual components of the mixture, namely RTV 41 and RTV 11 by themselves to form release layer 109 also gives an improvement over non-condensation type silicone coatings. However, the mixture appears to give a greater improvement.

According to a second preferred embodiment of the invention, a cross-linker such as ethyl silicate and conductive material such as carbon black or anti-static compounds such as CC-42 (Witco) are added to release layer 109. The added crosslinker provides for further improvement of the mechanical properties and very thin film polymerization of the release layer, while the added conductive material provides for improved electrical characteristics ad print quality.

Primers such as (3-glycidoxypropyl) trimethoxysilane (ABCR, Germany) and 1205 (Dow Coming), are used to provide for maximum adhesion of release layer 109 to the conforming layer.

Release layer 109 is preferably formed on the conforming layer using the following preferred process:

a) 100 grams of RTV 11 (GE) is dissolved in 16.7 gm Isopar-L (EXXON) and 50 gm hexane. 100 grams of RTV 41 (GE) is dissolved in 16.7 gm Isopar-L (EXXON) and 50 gm hexane. Both mixtures are centrifuged at 8000 RPM for 70 minutes. The liquid is decanted, the percent solids is determined and the precipitate solids, comprising filler material, mainly calcium carbonate, are discarded.

b) An amount of the RTV 11 solution which provides 60 gm RTV 11 solids is mixed with an amount of RTV 41 solution which provides 40 gm RTV 41 solids. To this mixture is added 1 gm Ketjenblack 600 carbon black (Akzo). The resulting mixture is dispersed with a high shear mixer for 8 minutes.

c) 10 gm oleic acid (J T Baker) is added to this mixture and the result is mixed in a high shear mixer for 90 seconds. 10 gm ethyl silicate (Chordip) crosslinker and 1.6 gm dibutyltin dilaurate (Aldrich), a slow catalyst, are added and the mixture is dispersed in the high shear mixture for 120 seconds. The resulting mixture is termed herein as a “release solution” and has a working life of several hours. The oleic acid inhibitor was found to improve the release properties of the resulting release layer.

d) A catalyst solution is prepared by dispersing 4 gm of fumed silica (R972, Degussa) in 96 gm xylene using a sonicator for 2 minutes. The silica aids in forming a film of the catalyst solution when it is coated onto the conforming layer, as described below, so that the catalyst and primer are not absorbed into the conforming layer. To prepare 100 gm of catalyst solution, 25 gm of the silica solution are mixed with 50 gm of (3-glycidoxypropyl) trimethoxysilane (ABCR, Germany), a silane based primer or adhesion promoter, 7 gm of stannous octoate (Sigma), a catalyst which results in a very rapid cure and 18 gm of xylene (J T Baker). The mixture is stirred with a magnetic stirrer for 3 min. This catalyst mixture has a working life of several hours. The (3-glycidoxypropyl) trimethoxysilane is a primer to aid in adhesion of the release layer to the underlying layers.

The blanket in roll form and the conforming layer in roll form are placed in a continuous coating machine. The continuous coating process involves first stripping away the metallized polyester from the soft side of the conforming layer and feeding the conforming layer and the underlying layers together into a laminator at 82° C. and 6 ATM pressure. After lamination, the metallized polyester covering the harder layer of the conforming layer is stripped away.

The harder layer is coated with the catalyst solution using, for example, an anilox cylinder, using a dry coating weight of about 1 $gm/m^2$. The catalyst solution is air dried and is then overcoated by the release solution using, for example, an anilox cylinder, to a dry coating weight of about 5 $gm/m^2$. The release layer is dried and cured at about 100° C. for less than one minute. The continuous web is cut into sheets and the resulting individual blankets are cured in an oven at 140° C. for 2 hours, to cure the conforming layer and to improve the adhesion of the release layer to the conforming layer.

The process as described above is suitable use in a continuous process wherein webs of conforming layer and blanket base are fed into a continuous process machine to be laminated therein and wherein the laminated material is fed past a first coater at which it is coated by a catalyst material (preferably also containing a primer and silica), the coating is dried, and the coated material is further coated by the release coating and dried and cured. The coating solutions have an adequate shelf-life so that such a continuous process is practical.

Some aspects of the invention are also useful in systems such as those using other types of intermediate transfer members such as belt or continuous coated drum type transfer members. The specific details given above (and in the documents incorporated herein by reference) for the image forming system are included as part of a best mode of carrying out the invention; however, many aspects of the invention are applicable to a wide range of systems as known in the art for electrophotographic and offset printing and copying. In particular the base (including the conforming layer, if any) is formed may be produced by any suitable means and may have any suitable structure known in the art. Furthermore, while the coating method is especially useful for condensation type silicones, which are useful for intermediate transfer members for toner images, for which there is no available methodology for continuous coating, the coating method may also be used for coating with other materials, utilizing suitable catalysts. Additionally, while the invention has been described as being used in a continuous coating process, the invention is also applicable to coating sheets of material in a batch process.

It will be appreciated by persons skilled in the art that the present invention is not limited by the description and example provided hereinabove. Rather, the scope of this invention is defined only by the claims which follow:

What is claimed is:

1. A method of producing a release coating on an intermediate transfer member, suitable for receiving a toner image on said coating and transferring the toner image to a further surface, the member comprising:

providing an intermediate transfer member body portion;

coating the body portion with a catalyst material;

overcoating the catalyst material with an uncured polymer material for which the catalyst is active; and curing tie polymer material to form the release coating.

2. A method according to claim 1 wherein the release coating material is a condensation type silicone.

3. A method according to claim 2, wherein the release coating material utilizes an alkoxy silane cross linker.

4. A method according to claim 2 wherein the condensation type silicone material comprises a combination of two different silicone materials.

5. A method according to claim 2 wherein at least the release coating is formed in a continuous coating process.

6. An intermediate transfer member produced according to the method of claim 2.

7. A method according to claim 1 wherein the catalyst coating comprises an adhesion promoter which promotes the adhesion of the cured coating to the body portion.

8. A method according to claim 4 wherein the adhesion promoter comprises a silane based primer.

9. A method according to claim 8 wherein the adhesion promoter comprises (3-glycidoxypropyl) trimethoxysilane.

10. A method according to claim 1 wherein the body portion comprises a conforming layer on which the catalyst material is coated.

11. A method according to claim 1 wherein the catalyst material comprises stannous octoate.

12. A method according to claim 1, wherein the intermediate transfer member is suitable for transfer of a liquid toner image.

13. A method according to claim 1 wherein at least the release coating is formed in a continuous coating process.

14. An intermediate transfer member for toner images, suitable for receiving a toner image from a first surface and transferring it to a second surface, comprising:

a body portion;

a release layer comprising a cured polymer material produced from a precursor material the body portion; and an underlayer between the release layer and the body portion, wherein the underlayer comprises a catalyst that is active for curing the precursor material, wherein the release coating layer comprises a condensation type silicone.

15. An intermediate transfer member according to claim 14 wherein the underlayer includes an adhesion promoter that promotes the adhesion of the cured polymer to the body portion.

16. An intermediate transfer member according to claim 15 wherein the adhesion promoter comprises a silane based primer.

17. An intermediate transfer member according to claim 16 wherein the adhesion promoter comprises (3-glycidoxypropyl) trimethoxysilane.

18. An intermediate transfer member according to claim 14 wherein the catalyst comprises stannous octoate.

19. An intermediate transfer member according to claim 14 wherein the release layer is a release material for toner.

20. An intermediate transfer member according to claim 19 wherein the release material is a release material for liquid toner.

21. An intermediate transfer member according to claim 14 wherein the underlayer comprises silica.

22. An intermediate transfer member according to claim 14 wherein the catalyst in the underlayer comprises a fast catalyst for the precursor material and wherein the release layer comprises a slow catalyst for the precursor material.

23. An intermediate transfer member according claim 14 wherein the release layer comprises dibutylyin dilaurate.

24. An intermediate transfer member according to claim 14 wherein the release layer comprises oleic acid.

25. An intermediate transfer member according to claim 14 wherein the body portion comprises a sheet of material.

26. A method of producing a release coating on a member comprising:

providing a body portion;

coating the body portion with a catalyst material;

overcoating the catalyst material with an uncured polymer material for which the catalyst is active; and curing the polyner material to form the release coating, wherein the release coating material comprises a condensation type silicone.

27. A method according to claim 26, wherein the release coating material utilizes an alkoxy silane cross linker.

28. A method according to claim 26 wherein the catalyst coating comprises an adhesion promoter which promotes the adhesion of the cured coating to the body portion.

29. A method according to claim 28 wherein the adhesion promoter comprises a silane based primer.

30. A method according to claim 28 wherein the adhesion promoter comprises (3-glycidoxypropyl) trimethoxysilane.

31. A method according to claim 26 wherein the body portion comprises a conforming layer on which the catalyst material is coated.

32. A method according to claim 26 wherein the condensation type silicone material comprises a combination of two different silicone materials.

33. A method according to claim 26 wherein the catalyst material comprises stannous octoate.

34. A method according to claim 26 wherein at least the release coating is formed in a continuous coating process.

35. A method according to claim 26 wherein the body portion comprises a sheet of material.

36. An intermediate transfer member comprising:

a release layer comprising oleic acid;

a support surface; and an underlayer between the release layer and the support surface, wherein the release layer comprises dibutyltin dilaurate.

37. An intermediate transfer member according to claim 36 wherein the underlayer comprises silica.

38. An intermediate transfer member according to claim 36 wherein the underlayer comprises a silane primer.

39. An intermediate transfer member according to claim 36 wherein the underlayer comprises stannous octoate.

40. An intermediate transfer member according to claim 36 wherein the support surface is the surface of a sheet of material.

41. An intermediate transfer member comprising:

a release layer comprising oleic acid;

a support surface; and an underlayer between the release layer and the support surface, wherein the underlayer comprises silica.

42. An intermediate transfer member according to claim 41 wherein the underlayer comprises a silane primer.

43. An intermediate transfer member according to claim 41 wherein the underlayer comprises stannous octoate.

44. An intermediate transfer member according to claim 41 wherein the support surface is the surface of a sheet of material.

45. An intermediate transfer member comprising:

a release layer comprising oleic acid;

a support surface; and an underlayer between the release layer and the support surface, wherein the underlayer comprises a silaxie primer.

46. An intermediate transfer member according to claim 45 wherein the underlayer comprises stannous octoate.

47. An intermediate transfer member according to claim 45 wherein the support surface is the surface of a sheet of material.

48. An intermediate transfer member comprising:

a release layer comprising oleic acid;

a support surface; and an underlayer between the release layer and the support surface, wherein the underlayer comprises stannous octoate.

49. A method according to claim 1 wherein the body portion comprises a sheet of material.

50. An intermediate transfer member according to claim 48 wherein the support surface is the surface of a sheet of material.

* * * * *

UNITED STATES PATENT AND TRADEMARK OFFICE

CERTIFICATE OF CORRECTION

PATENT NO. : 6,551,716 B1 Page 1 of 1
DATED : April 22, 2003
INVENTOR(S) : Benzion Landa et al.

It is certified that error appears in the above-identified patent and that said Letters Patent is hereby corrected as shown below:

Column 11,
Line 39, change "tie" to -- the --

Column 12,
Line 6, after "material" add -- on --
Line 48, change "polyner" to -- polymer --

Column 14,
Line 11, change "silaxie" to -- silane --

Signed and Sealed this

Thirtieth Day of December, 2003

JAMES E. ROGAN
*Director of the United States Patent and Trademark Office*